Oct. 27, 1970  K. A. W. KEMP  3,536,421
LIQUID FUEL PUMPING APPARATUS
Filed Aug. 16, 1968  2 Sheets-Sheet 2

INVENTOR
Kenneth Albert Wallace Kemp
BY
ATTORNEYS

United States Patent Office 3,536,421
Patented Oct. 27, 1970

3,536,421
LIQUID FUEL PUMPING APPARATUS
Kenneth Albert Walters Kemp, Ealing, London, England, assignor to C.A.V. Limited, London, England
Filed Aug. 16, 1968, Ser. No. 753,170
Claims priority, application Great Britain, Aug. 16, 1967, 37,693/67; Sept. 25, 1967, 43,489/67
Int. Cl. F02d 1/04; F04b 13/02, 49/08
U.S. Cl. 417—251                                 5 Claims

ABSTRACT OF THE DISCLOSURE

A liquid fuel pumping apparatus for supplying fuel to an internal combustion engine and including an axially movable metering valve which at one end is acted upon by centrifugally operable means and which at its other end is acted upon by a coiled compression spring, the metering valve acting to control the quantity of fuel delivered by the apparatus, a metering valve also having a bore to which fuel is fed through a restricted orifice and the bore being closed by a valve element which is acted upon by the force exerted by the governor means and spring, the arrangement being that the pressure of fuel within the bore is controlled in a manner which varies in accordance with the speed at which the apparatus is driven.

---

This invention relates to liquid fuel pumping apparatus for supply fuel to internal combustion engines and of the kind comprising in combination, an injection pump driven in timed relationship with the engine and which during an injection stroke delivers fuel to the engine, a feed pump arranged to supply fuel to the injection pump during the filling strokes thereof, a metering valve the setting of which controls the quantity of fuel supplied to the injection pump, a fuel pressure operable device for effecting a control over the injection pump, the output pressure of the feed pump being used to actuate said device and a pressure regulator for modifying the pressure applied to said device.

The object of the invention is to provide such an apparatus in a simple and convenient form.

According to the invention in an apparatus of the kind specified the metering valve comprises an axially movable member, the axial setting of which controls the quantity of fuel supplied to the injection pump, a governor spring means acting to move the member in a direction to increase the quantity of fuel supplied to the injection pump, centrifugally operable means acting to move the member in opposition to the spring means upon increase of speed, a valve chamber, said valve chamber being in communication with the outlet of the feed pump by way of a restriction, said valve chamber also being in communication with said fuel pressure operable device, and a valve element mounted in said valve chamber, the valve element being movable to an open position against the force exerted by said means, by the pressure of fuel within said chamber to permit fuel to excape from said chamber thereby to control the fuel pressure within said chamber in a manner dependent upon the speed at which the apparatus is driven.

Figure 1:
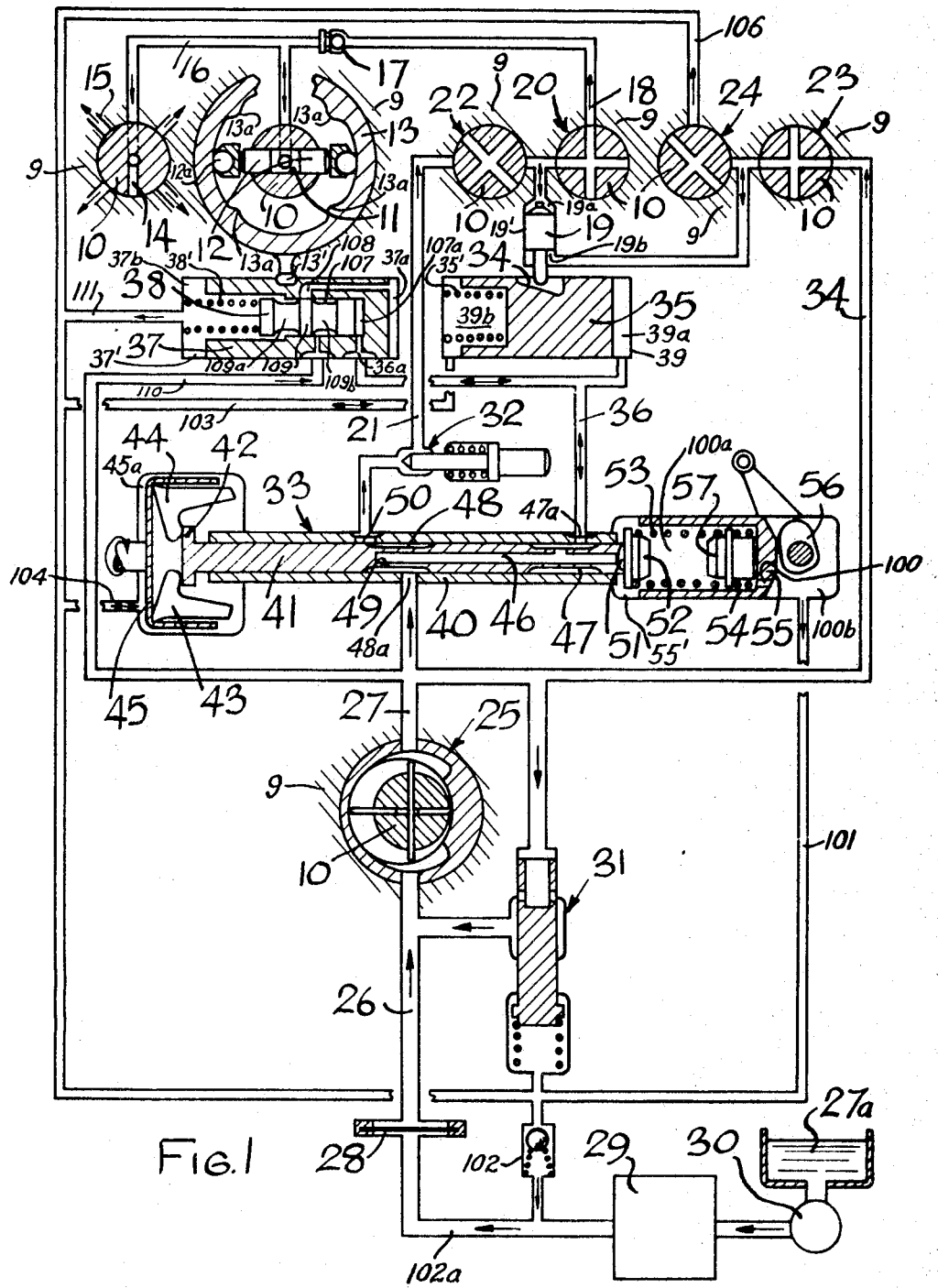
Figure 2:
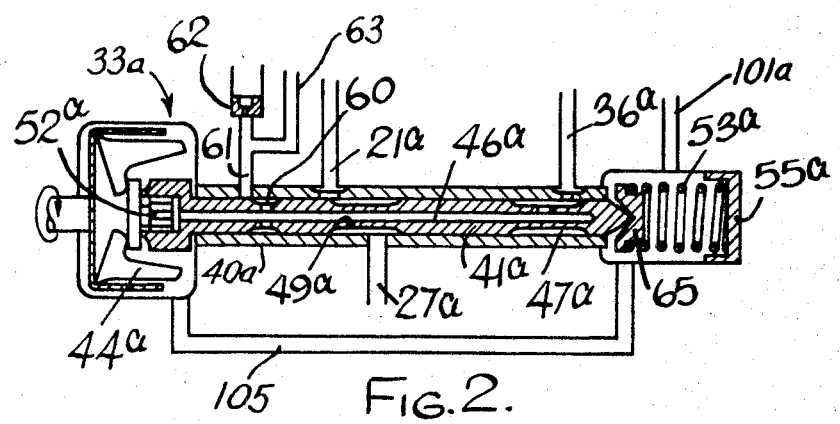

In the accompanying drawings:
FIG. 1 is a diagrammatic representation of one example of a pumping apparatus in accordance with the invention,
FIG. 2 is a modification of part of the apparatus of FIG. 1.

Referring to FIG. 1 the apparatus comprises a body part schematically shown by the crosshatching 9 in which is journalled a rotary cylindrical distributor member 10 shown divided into seven parts for illustrative convenience. The distributor member is adapted to be driven in timed relationship with the engine with which the apparatus is associated and at one point in the distributor member there is formed a transversely extending bore 11 in which is mounted a pair of reciprocable pumping plungers 12. Surrounding the distributor member at this point is an annular cam ring 13 having on its internal periphery, a plurality of pairs of diametrically disposed cam lobes 13a. The cam lobes 13a through the intermediary of rollers 12a respectively act upon rotation of the distributor member 10, to move the pumping plungers 12 inwardly thereby to expel fuel contained within the transverse bore 11.

The transverse bore 11 communicates with a passage 16 extending within the distributor member and at one point this passage communicates with an outwardly extending delivery passage 14 which is adapted to register in turn and as the distributor member rotates, with a plurality of outlet ports 15 formed in the body part 9. The outlet ports in use are connected to the injection nozzles respectively of the associated engine (not shown).

The passage 16 is in communication by way of a check valve 17 with a passage 18 and this passage can be brought into communication with a chamber 19a at one end of a cylinder 19′ containing a slidable shuttle 19 by means of a rotary valve 20. The aforesaid chamber 19a of the cylinder 19′ at other times, as will be explained, can be placed in communication with a feed passage 21 by a rotary valve 22.

The chamber 19b at the other end of the cylinder 19′ containing the shuttle 19 can be placed in communication with a source of fuel at high pressure by means of a rotary valve 23 or with a source of fuel at low pressure by means of a rotary valve 24. The rotary cylinder 24 communicates with passage 106 through which fuel from the chamber 19b passes to the inlet 26 of the feed pump 25 via non-return valve 102 when the shuttle 19 is moved downwardly by pressure of fuel in chamber 19a. The valves 20, 22, 23 and 24 are formed in or on the distributor member 10 and are driven in timed relationship with the engine. In addition also mounted on the distributor is a feed pump 25 of the vane type and having an inlet 26 and an outlet 27. The inlet 26 is in communication with a supply of fuel 27a by way of a pair of filter units 28 and 29 and a lift pump 30 is provided to ensure the supply of fuel to the feed pump. The output pressure of the feed pump 25 is controlled by a relief valve 31 which spills fuel between the inlet 26 and outlet 27 of the pump 25.

The outlet 27 of the feed pump 25 is in communication with the feed passage 21 by way of a normally open valve 32 and a metering valve 33 which will be described in greater detail later in the specification. In addition the outlet 27 of the feed pump 25 can be placed in communication with the aforesaid chamber 19b of the cylinder 19′ containing the shuttle 19 by way of passage 34 and rotary valve 23 as explained above.

The operation of the apparatus thus far described is as follows. With the parts of the apparatus in the position shown in FIG. 1 fuel is flowing from the outlet 27 of the feed pump 25 by way of passage 34 and the valve 23 to said chamber 19b of the cylinder 19′ and the shuttle 19 is being moved towards said chamber 19a of the cylinder 19′. Fuel is therefore displaced from this chamber 19a of the cylinder 19′ and flows by way of the rotary valve 20 and the check valve 17 to the passage 16 and particularly to the bore 11. The plungers 12 are therefore moved outwardly an amount dependent upon the quantity of fuel displaced by the shuttle 19.

During continued rotation of the distributor 10, the passage 14 is brought into register with an outlet port 15 and during this time the plungers 12 are moved inwardly by engagement of the rollers 12a with the cam lobes 13a on rotation of the distributor 10 and fuel is displaced from the bore 11 to appropriate engine cylinders. Also during this time the rotary valves 20 and 23 are closed by rotation of the distributor 10 of which they form a part and valves 22 and 24 opened so that fuel now flows to said chamber 19a of the cylinder 19′ containing the shuttle 19 and the shuttle is moved towards the other chamber 19b of the cylinder. The quantity of fuel which is supplied to the cylinder 19′ is controlled by the metering valve 33 which thus determines the quantity of fuel which is supplied to the engine at each injection stroke. During continued rotation of the distributor member 10 the process described above is repeated and fuel is supplied to the engine cylinders in turn.

It will be appreciated that the shuttle 19 determines the maximum quantity of fuel which can be supplied by the apparatus at each injection stroke. The maximum quantity of fuel which can be supplied to an engine without the emission of smoke from the exhaust of the engine varies with speed so that the maximum excursion of the shuttle must be made to vary in accordance with the speed of the engine. For this purpose the shuttle 19 is provided with an extended end portion which can co-operate with a cam surface 34 formed on a spring loaded piston 35. The piston is movable against the action of its spring 35′ by means of fuel supplied under pressure to the chamber 39a at one end of the cylinder 39 by way of a passage 36 through the metering valve 33 from the outlet 27 of the feed pump 25. The pressure of the fuel is dependent upon the speed at which the apparatus is driven and the way in which it is derived will be explained, the result is that the axial setting of the piston 35 will be dependent upon the speed and consequently the allowed excursion of the shuttle 19 will also be dependent upon the speed. The chamber 39b at the other end of the cylinder 39 is connected with a passage 103 to permit fuel to enter and escape from the cylinder 39.

Also provided is a servo piston 37 which is connected to the cam ring 13 by means of a peg 13′. The servo piston is provided with a lined bore 107 and mounted within the bore is a servo valve 38. The servo valve 38 is loaded by a spring 37′ towards the blind end 107a of the bore 107. Moreover, the blind end 107a of the bore 107 is in constant communication with the passage 36 through the port 36a so that the axial setting of the servo valve 38 will be dependent upon the speed at which the apparatus is driven. Formed in the wall of the blind bore at a position intermediate its ends there is a port 108 which communicates with the chamber 37a defined by the cylinder 37′ containing the piston 37 at the end 37b thereof remote from the spring 38′.

The servo valve 38 is provided with a land 109 on opposite sides of which are a pair of grooves. The groove 109a on the side of the land 109 adjacent the spring 38′ communicates with the inlet of the feed pump 25 by way of chamber 37b, passage 111 and the non-return valve 102 and the other groove 109b communicates with the outlet 27 of the feed pump 25 by way of a conduit 110. In an equilibrium position as is shown, the port 108 is covered by the land 109 but as the speed at which the apparatus is driven increases the servo piston 38 will move to the left as seen in the drawing to uncover the port 108 and to allow fuel from the outlet 27 of the feed pump 25 to flow into the chamber 37a of the cylinder 37′ containing the servo piston 37. Thus, the piston 37 will move to the left until the port 108 is again closed. If the speed at which the apparatus is driven decreases, then the servo piston 37 will move to the right thereby to allow fuel to escape from the aforesaid chamber 37a of the cylinder 37′ by way of the port 108. As the servo piston 37 moves axially, angular movement is imparted to the cam 13 via the peg 13′ thereby to control the timing of injection of fuel to the engine.

Considering now the metering valve 33. This comprises a sleeve 40 which is fixed within the body of the apparatus. Within the sleeve 40 there is mounted an axially slidable rod member 41 which at one end is provided with a head 42 against which bear the toe portions of a pair of a pair of governor weights 43, 44. The weights are mounted within a cage 45 which is driven by gearing (not shown) from the distributor member 10 so that the speed of rotation is directly proportional to the speed at which the apparatus is driven. A passage 104 is provided as a balancing conduit to permit fuel to flow into and out of the chamber 45a which contains the cage 45.

Extending axially within the rod member 41 is a valve chamber defined by a bore 46 and which is open to the end of the rod member 41 remote from the weights 43, 44. The bore 46 is in full communication with a circumferential groove 47 formed on the periphery of the rod member 41 and this groove 47 is in open communication with the passage 36 through the port 47a. The bore 46 is in restricted communication with a further circumferential groove 48 by way of an orifice 49. The groove 48 is in open communication with the outlet 27 of the feed pump 25 through the port 48a and is in variable communication with a port 50 formed in the sleeve 40. The port 50 communicates with the feed passage 21.

The bore 46 at its open end constitutes a spill port 51 which can be closed by a valve element 52 urged to close the port 51 by a pair of governor springs 53, 54. These springs are partly housed within a hollow and slidable abutment 55 the position of which is controlled by an operator adjustable cam 56. Intermediate the two springs 53, 54 is a stop member 57 and which acts to limit the deflection of the relatively light spring 54. Fuel escaping from spill port 57 into chamber 100a in the housing 55′ containing the abutment 55 passes through port 100 in the abutment 55 to chamber 100b where it communicates through passage 101 and the non-return valve 102 to the inlet 26 of the feed pump 25 through the passage 102a and the filter 28.

In use, the axial position of the rod member 41 and therefore the degree of registration of the groove 48 and the port 50 is determined by the force acting on one end of the rod 41 due to the weights 43, 44 and the opposing force exerted by the spring or springs 53, 54. For a steady speed these forces are balanced but should the speed vary then the rod 41 will move axially to increase or decrease the registration of the groove 48 and port 50 so as to increase or decrease the quantity of fuel supplied to the engine. In this manner the weights, 43, 44 and springs 53, 54 together with the rod member 41, groove 48 and port 51 act as a mechanical governor. By altering the force exerted by the spring or springs 53, 54 the operator can control the speed at which the engine operates.

The fuel under pressure within the bore 46 acts intermediate the rod member 41 and valve element 52 to effect separation thereof. The force developed is opposed by the force transmitted through the rod member 41 i.e. the force exerted by the weights 43, 44 or the governor springs 53, 54. As the valve element 52 is moved away from the rod member 41 fuel is spilled from the bore 46 and due to the orifice 49 the pressure therein falls until an equilibrium position is reached. With variation in speed the pressure rises or falls depending on the change of speed and due to the fact that the force developed by the weights 43, 44 depends upon the square of the speed so the fuel pressure within the bore 46 depends upon the square of the speed.

The light spring 54 is only used at the idling speed of the engine to make the governors more sensitive. In addition it will be noted that in the event that the abutment 55 is moved to compress the springs 53 and 54 fully, the valve element 52 will move into contact with the end of the sleeve 40. This movement whilst sufficient to ensure that maximum fuel is supplied to the engine is not sufficient to cause any significant variation in the pressure of fuel in the bore 46.

In FIG. 2 the valve element 52 is replaced by a valve element 52a which is positioned at the other end of the rod member 41a. The mode of operation however is exactly the same as the previous example. As shown in FIG. 2 a third circumferential groove 60 is provided in open communication with the bore 46a. For registration with the groove 60 there is provided a port 61 which is in communication with a drain through a fixed orifice 62. A point intermediate the port and orifice is connected via conduit 63 to a piston cylinder combination which may for instance, be the timing piston 37. The pressure at this point besides being dependent upon speed is also dependent upon the load on the engine since it varies in accordance with the setting of the metering valve 33a. In the example of FIG. 2 the spring 53a acts on the rod member 41a through the intermediary of a spring abutment 65 and this is shaped to co-operate with the sleeve 40a to prevent any significant variation in the pressure of fuel in the bore 46a in the event that the spring 53a is compressed fully. The fuel which spills from the bore 46a by lifting of the valve element 52a flows by ways of a conduit 105 to the chamber 115 containing the sliding abutment 55a and then to the conduit 101a similar in function to the conduit 101 in the embodiment of FIG. 1.

Having thus described my invention what I claim as new and desire to secure by Letters Patent is:

1. A liquid fuel pumping apparatus for supplying fuel to an internal combustion engine and comprises a body part, a rotary fuel distributor means mounted in said body part and arranged to be driven in timed relationship with the engine with which the apparatus is associated, said distributor means including a feed pump having an outlet, said distributor means further including an injection pump, a control means for controlling the operation of said injection pump, a metering valve comprising an axially movable member, the axial setting of which controls the quantity of fuel supplied to said injection pump, a governor spring means acting to move said member in a direction to increase the quantity of fuel supplied to said injection pump, centrifugally operable means acting to move said member in opposition to said spring means upon increase of speed, a valve chamber defined in said member and having an open end, means defining a restricted orifice communicating between said valve chamber and said feed pump, said valve chamber also being in communication with said control means, and a valve element pressed against said open end of said valve chamber by said spring means, the valve element being movable to an open position against the force exerted by said governor spring means and said centrifugally operable means, by the pressure of fuel within said chamber to permit fuel to escape from said chamber, thereby to control the fuel pressure within said chamber in a manner dependent upon the speed at which the apparatus is driven.

2. An apparatus as claimed in claim 1 in which said valve chamber is in the form of a bore extending within said axially movable member and open to one end thereof, the open end of said bore defining a spill port with which said valve element co-operates, and one of said means acting on said axially movable member through the intermediary of said valve element.

3. An apparatus as claimed in claim 2 including manually operable means cooperatively associated with said governor spring means for adjusting the force exerted by said governor spring means to control the quantity of fuel supplied to said injection pump.

4. An apparatus as claimed in claim 3 further including means for limiting the axial movement of said valve member resulting from an increase in the force exerted by said governor spring means.

5. An apparatus as claimed in claim 4 including a discharge path from said bore, said discharge path including a port the size of which varies in accordance with the setting of said metering valve, and a fluid orifice through which fuel flowing through said port flows to a drain, and a conduit extending from a point intermediate said port and said fixed orifice, the fuel pressure within said conduit being dependent upon the speed and the load on the engine with which the apparatus is associated.

References Cited

UNITED STATES PATENTS

| | | | |
|---|---|---|---|
| 3,168,042 | 2/1965 | Bessiere | 103—2 |
| 3,179,100 | 4/1965 | Glikin | 103—2 |
| 3,207,140 | 9/1965 | Roosa | 103—2 |
| 3,215,079 | 11/1965 | Roosa | 103—2 |
| 3,228,339 | 1/1966 | Evans et al. | 103—2 |
| 3,263,614 | 8/1966 | Kemp | 103—2 |
| 3,289,590 | 12/1966 | Hutcheon | 103—2 |
| 3,319,616 | 5/1967 | Glikin | 103—2 |
| 3,394,688 | 7/1968 | Roosa | 103—2 |
| 3,410,216 | 11/1968 | Kemp | 103—2 |

HENRY F. RADUAZO, Primary Examiner

U.S. Cl. X.R.

417—253, 294